United States Patent Office 3,825,481
Patented July 23, 1974

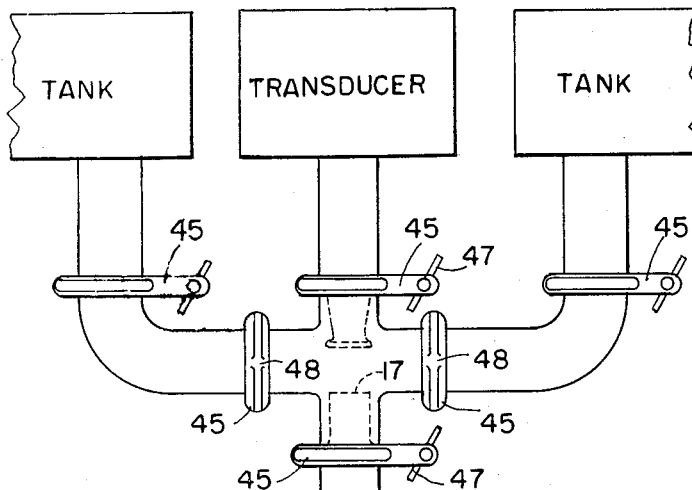
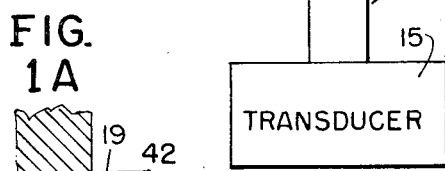
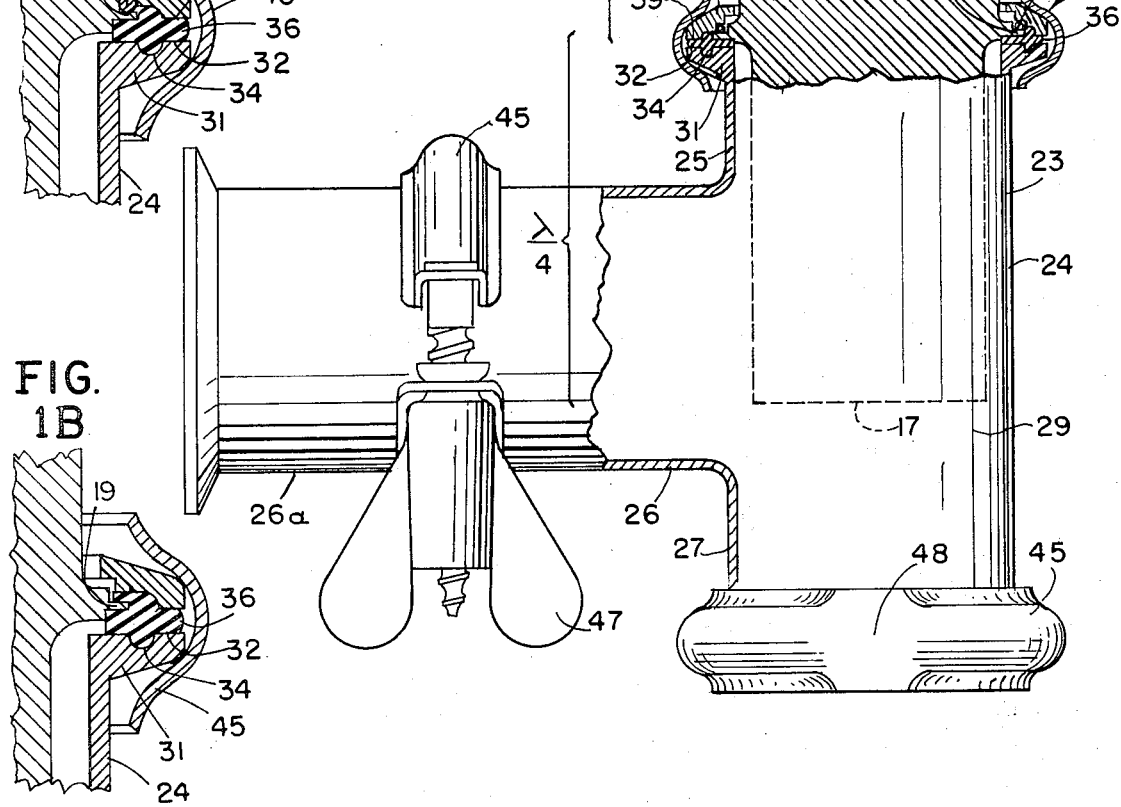

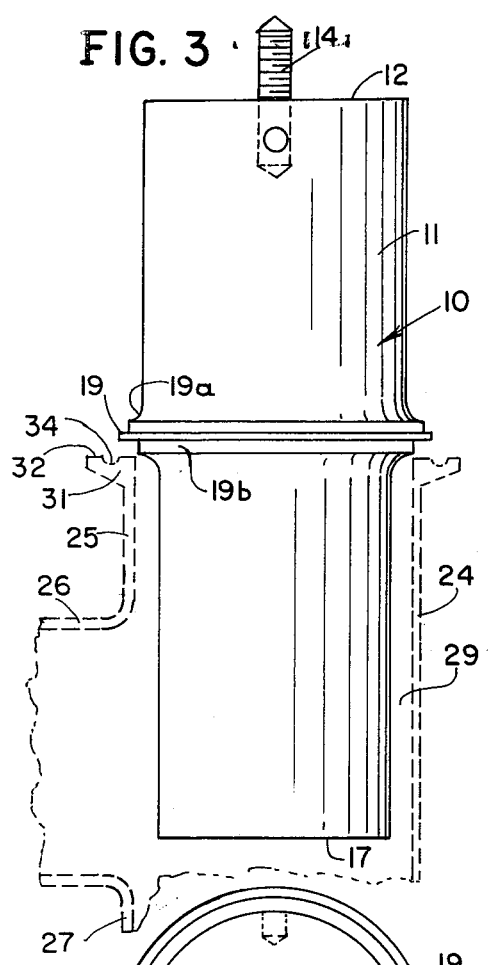
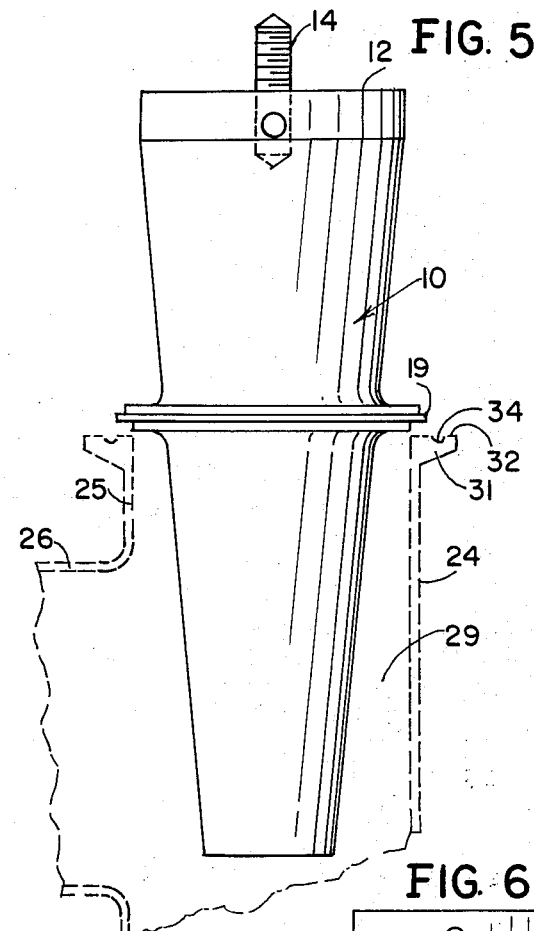
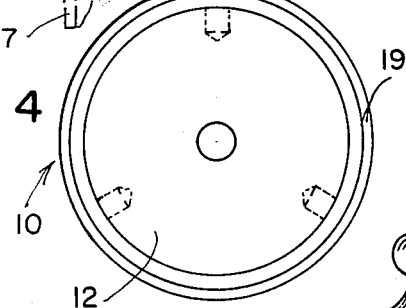
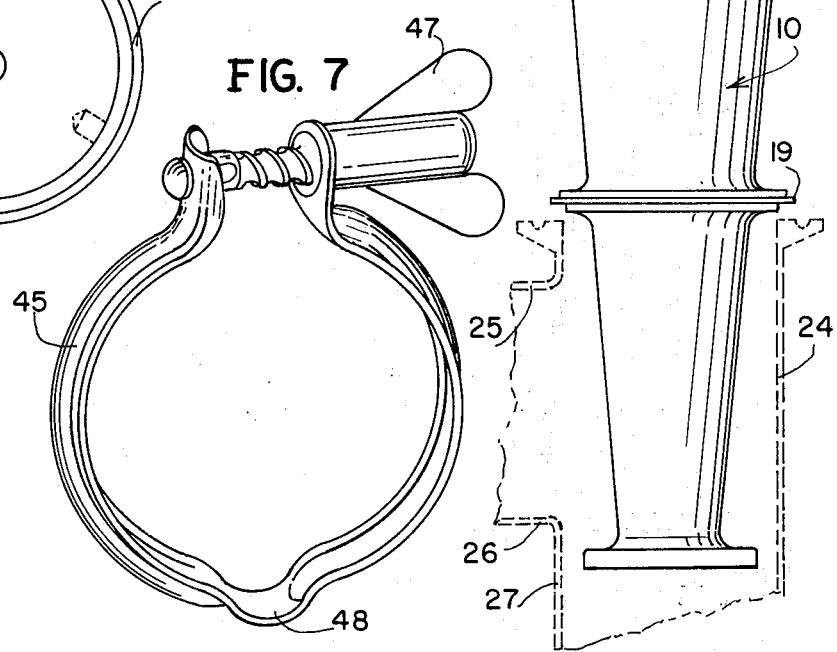

3,825,481
FLUID FLOW SONIC ENERGY REACTOR
Michael C. Supitilov, St. Charles, Ill., assignor to
Du Kane Corporation, St. Charles, Ill.
Filed Apr. 30, 1973, Ser. No. 356,011
Int. Cl. B01k 1/00; A23l 3/30
U.S. Cl. 204—193        11 Claims

ABSTRACT OF THE DISCLOSURE

A sonic energy reactor for handling a stream of fluid consists of a horn having a length of an integral number of ½ wave lengths, said horn having a sonic input and a sonic output for longitudinal vibration. About a nodal region of the horn is an external, integral mounting flange. Associated with the horn is a fitting having at least three pipe stubs extending from the fitting body with the stub interiors communicating with a chamber within the fitting body for fluid flow between stubs. At least one of the stubs is sufficiently large to permit the horn portion between the horn output end and the mounting flange to be inserted into said one stub interior, the relative dimensions being such that the free end of such horn constituting the sonic energy output end reaches a desired location in the chamber in the fitting body interior. The free end of said one pipe stub is shaped to cooperate with the horn mounting flange and additional parts for providing a detachable coupling between the horn and fitting. This detachable coupling includes among other things a gasket of sonic energy insulating means such as rubber for inhibiting the escape of sonic energy from the horn to the fitting and to contain the fluid. Sonic energy discharged at the output end of the horn is effective to act upon material flowing past the horn portion for sonic energy irradiation. The remaining stubs of the fitting are adapted to function as fluid flow inlets and outlets and if sufficient stubs are available, may accommodate additional horns for irradiation. All stubs are detachably coupled to fluid feed pipes or one or more ultra-sonic horns. Such a construction permits ready assembly and/or disassembly of all components constituting the reactor and horn assembly permitting cleaning, sterilization and visual examination for observing the amount of physical wear of said horn output end. By controlling the relative dimensions of a fitting pipe stub and horn, the relative disposition of the output end of a horn within a fitting chamber may be controlled for the purpose of subjecting fluid particles to compression, tension and/or shear, the latter depending upon the relative shapes of the surfaces of horn and fitting interiors. By selecting appropriate materials, usually metals such as stainless steel, titanium and utilizing standardized and accepted fittings available in the market, a sonic energy reaction device may be available for use in fluid treatment processes, cosmetics, drugs, corrosive chemicals and various other fields where standard or special fittings are available.

This invention relates to a fluid flow sonic energy reactor and more particularly to a reactor which may consist in part of a readily available fitting for defining a chamber through which a flow of fluid or particles may be maintained in a field subjected to sonic energy irradiation. The actual irradiation of sonic energy is accomplished by a horn suitably energized from an ultra-sonic transducers, said horn having an energy input end at an anti-node for connection to such transducer and an energy output end at an anti-node for insertion into a chamber defined by the body of such fitting. The fitting has suitable means for directing the flow of fluid or fine particles through such chamber for exposure to the ultra-sonic energy.

THE FIELD OF APPLICATION AND BACKGROUND FOR THE INVENTION

While the invention is generally applicable to various processes utilizing ultra-sonic energy, it is particularly applicable to the general art of irradiating with ultra-sonic energy a stream of fluid or semifluid material for obtaining a desired physical, chemical or other result in the treated material. As a rule such irradiation occurs within a closed region functioning as a reactor chamber where ultra-sonic energy falls on a stream of material flowing past the sonic output end of an ultra-sonic horn suitably energized to perform the irradiation function.

In connection with such procedures, one of the problems has been to provide a simple and readily available means for creating a satisfactory irradiation chamber. Another problem involves the necessity for easily dismantling an irradiation set-up. This latter requirement is based upon a number of factors. One depends upon the fact that physical wear of the discharge portion of a horn and to some extent the chamber walls occurs thus making it necessary to inspect the horn and chamber for possible replacement. Another and even more important consideration relates to the possible application of ultrasonic irradiation to foods, medicaments and cosmetics, etc.

In the case of food handling, rigorous government requirements involving the nature of the material contacted by the food limits the variety of metals or materials which may be used. In addition thereto there is a requirement in such food handling devices that calls for frequent dismantling, cleaning and sterilizing parts which are contacted by food or where food may lodge. In the design of such devices, pockets where food may collect must be avoided. Whenever a device through which food passes is shut down at the end of a work day or a work shift, it is generally mandatory that the apparatus through which the food passes and where it is processed be completely dismantled and the parts thereof be thoroughly cleaned and sterilized. Any remanent food particles or food drops must be removed. The same considerations generally apply to cosmetics, where mixing of certain ingredients occurs, or where medications are compounded in the manufacture of certain drugs and chemicals. In the case of food handling devices, the necessity for absolute cleanliness and sterilization are obvious. In processing certain medications or materials, complete sterilization is essential not only to avoid undesired bacteria but in processes involving fermentation, it is necessary to avoid the entry into the system of foreign strains or agents which can modify the desired reaction.

Particularly in the field of food handling such as, for example, milk or milk products, industry, under the guidance of rules and regulations issued by federal and state authorities has provided numerous and varied plumbing accessories through which foods can be moved or handled. Such plumbing items are already approved for use in the dairy industry and other food handling industries both as to the nature of the material of which such items are made as well as the design thereof. Such plumbing items include pipes, fittings such as for example elbows, T's, crosses, Y's and modifications thereof. As a rule such plumbing items are so designed and constructed as to be able to be readily coupled or uncoupled from other plumbing items. For example, it is possible to obtain on the market, already approved for use by the dairy industry, the above-identified items having readily attachable and detachable couplings togther with approved gaskets of approved materials. Generally such couplings involve quickly installed or removable clamps for ensuring a tight connection between pipes, fittings and the like.

Discoveries in the food processing, cosmetic, drug and other fields have led to the application of ultra-sonic radiation for promoting certain physical changes such as for example, emulsification, sterilization and other desirable results or changes. Such irradiation is usually performed within a closed chamber through which the fluid or food material or cosmetic material or other material being handled can pass. The effectiveness and efficiency of such irradiation depends in a large measure upon the shape of the walls of the chamber and the dimensions thereof.

The requirement for ready dismantling and sterilization of food handling devices coupled with technical requirements for ultra-sonic irradiation has seriously hampered the application of ultra-sonic energy in these fields. This is due in part to the expenses in designing and manufacturing specialized equipment. The above drawbacks are compounded by the necessity for not only using approved metals but also designs for satisfying the dairy industry as one example. Thus in connection with the dairy industry, approved metals such as stainless steel, make it difficult to provide specially designed and useful equipment.

THE INVENTION GENERALLY

The invention basically involves the combination of an acoustic horn and a conventional fitting readily available on the market in various sizes and kinds from various materials, all approved for various areas of use without further action. As available in the industry, and as required thereby, many fittings are designed and constructed to be readily and quickly detachable from each other. Since such fittings are available in the market at reasonable prices and are already approved for specialized uses as the dairy industry, it is clear that from the point of view of the public, the fact that a standardized plumbing fitting can be used instead of requiring a special design represents a tremendous advantage to possible users of the invention. The only special item involved in the invention resides in the horn and even such an item may be available in the ultra-sonic equipment manufacturing industry and may be used with changes in the manufacture and/or structure of conventional horns.

This is not to say that any acoustic horn in the industry can be put together with a standardized fitting. The horn must be of a suitable material satisfactory to the particular industry involved and function effectively in ultra-sonic work. By selecting apropriate sizes of horn and fitting and adapting the horn for mounting in such fitting, the invention makes possible the creation of a reaction chamber for ultra-sonic radiation. The horn requires a mounting flange at a nodal region and a fitting with detachable coupling elements for the fitting pipe stubs. The detachable coupling between horn and one fitting pipe stub must meet requirements for ultra-sonic isolation and support, avoiding metallic continuity, in addition to being fluid tight.

It is understood that any material which can flow through pipes can be irradiated in the new system.

Inasmuch as horns are made in various shapes and present no unusual fabrication problems, the practice of the invention in connection with various ultra-sonic procedures becomes possible at minimum expense and with minimum problems to one who owns an ultra-sonic transducer system which can energize the horn.

The invention generally contemplates a suitable horn, having a length of an integral number of half wave lengths at the operating frequency of the system, adapted to be fed at an input end thereof with ultra-sonic energy from a transducer or generator. The horn may have any one of a number of shapes to determine the nature of the sonic output, such shapes usually determining the amplitude of radiated sonic energy. About a nodal region of the horn, an annular mounting flange for mounting the horn is provided. The shape of the mounting flange will be determined by the nature of detachable couplings joining said horn to a suitable fitting. A desirable fitting has a body within which a chamber is provided, said body having at least three pipe stubs extnding therefrom. The pipe stubs have their interiors communicating with the chamber within said fitting body. A desired fitting has the free pipe stub ends shaped to form parts of quickly detachable couplings to facilitate physical separation of fluid flow members such as pipes, elbows, reducers, enlargers, etc. At least one of the pipe stubs is so dimensioned that the horn portion between the mounting flange and output may be inserted into the interior of said one stub, with the horn and said one pipe stub being detachably coupled together. Each detachable coupling will usually include one or more gaskets of suitable material, and a mounting ring.

The length of said one pipe stub into which a horn portion lies will usually, though not always, be short enough (for most applications less than ¼ wave length) so that the end of the horn for radiating ultra-sonic energy will be at a desired location within the chamber of the fitting body or may come close to or at the inner end of any desired stub. The pipe stubs will usually have a circular cross section and may all have the same inside diameter, or not, to obtain desired control over the fluid stream. By suitable control over the dimensions and shape of the horn as well as the chamber of the fitting, fluid flow past the radiating end of the horn may be established to provide sonic energy irradiation as desired. As will be more fully explained later, a fluid or semifluid material passing through the ultra-sonic field within the chamber may be subjected to compression on such particles, or tension or shear, all depending upon the shapes and dimensions of the chamber defining walls. The depth of penetration of the output end of the horn into the chamber may be adjusted by controlling the length of the one pipe stub or the positioning of the horn part within the one pipe stub.

The fitting previously referred to may accommodate or may have more than three pipe stubs wherein it is possible to mount more than one horn in appropriate pipe stubs with spacing between the output ends of two horns set to obtain desired sonic field intensity and interaction (in phase or opposed phase). It is understood that each horn will have an individual means for supplying sonic energy to the input thereof. The nature of the materials making up the fitting and horn, the type of detachable couplings and the like will comply with the procedures called for by the particular field of application.

It will be evident that the invention makes possible experimental or production use of ultra-sonic equipment in various fields while satisfying at all times the requirements of industry and, when present, governmental standards. In addition to food, pastes, oils and mixes for cosmetics, medication, and the like, the application of the invention to such areas of use for both experimental or production procedures is readily possible. Other applications including the chemical fields are also possible. It is also possible to have successive batteries of fittings each of which may have a complement of horns, etc. to enhance processing time or steps.

DESCRIPTION OF THE DRAWINGS

The invention will now be described in conjunction with the drawings wherein:

FIG. 1 is an elevation, partly in diagrammatic form, with parts broken away, showing the new device comprising a T fitting available in the market in various sizes in stainless steel and approved for dairy industry use, the view showing a transducer in block form and also showing an added length of pipe coupled to a pipe stub.

FIG. 1A shows an enlarged detail of the gasket and mounting ring arrangement in FIG. 1.

FIG. 1B shows an enlarged detail similar to FIG. 1A but showing a modified form of gasket.

FIG. 2 shows a diagrammatic view of the invention applied to a cross fitting, there being two transducers mounted on opposite stubs of the cross.

FIG. 3 is an elevation of the horn of FIG. 1.

FIG. 4 is a plan view of the input end of the horn of FIG. 3.

FIG. 5 is an elevation of a tapered horn which may be used with a fitting for utilizing the invention.

FIG. 6 is an elevation of a still different horn which may be used with an appropriately dimensioned fitting for subjecting a stream of fluid or particles to shear forces at certain parts of the fluid path.

FIG. 7 is a perspective view of the clamp used in the device illustrated in FIG. 1.

DESCRIPTION OF SPECIFIC EMBODIMENT OF INVENTION

Horn 10 illustrated in FIGS. 1 and 3 of any suitable shape is here shown as having portion 11 one end of which is anti-node 12 and constitutes the sonic energy input for the horn. Horn input 12 is provided with headless bolt 14 suitably anchored into the end of horn 10. Bolt 14 is preferably of steel and may be mounted or threaded in a recess in the horn end. The length of bolt 14 is great enough so that a strong coupling between input antinode 12 of the horn and the anti-node output end of a transducer 15 shown in block form is obtained. Transducer 15 may be a device as disclosed in my prior application Ser. No. 321,976, filed Jan. 8, 1973, now U.S. Pat. No. 3,772,538, or may be any one of a number of transducers on the market. It is not necessary that transducer 15 be of any particular type. Thus transducer 15 may be of the Magnetostrictive type or piezo-ceramic type.

The sonic frequency may be the commonly used 20 kHz. or ay be lower or higher than that particular value. As is well known, the physical dimensions of the horn will depend upon the operating frequency. The overall shape of the horn may be any one of a large number of known and widely used shapes. It is understood that the desired mode of vibration is longitudinally of the horn. Horn 10 has a sonic output anti-node end 17 which may have any desired shape. The nature of the horn material will be determined primarily by the requirements of the medium in which the horn works as well as by the acoustic properties thereof.

For use in the food industry, horn 10 may be of titanium. This material has desirable acoustic or sonic properties, is inert, is available and can be machined. Other metals or materials may be used for the horn for other fields where the fluid to be operated on imposes different requirements. The horn may have any desired shape and in this instance is conveniently of such a shape as to have a circular cross section at all places along the horn length. This however is not essential.

The length of the horn between the input and output ends thereof must be an integral number of half wave lengths of the operating frequency. The length of a longitudinal wave depends partly upon the frequency and also upon the nature of the horn material. As a rule, a horn is usually made somewhat longer than theoretically required and will be "fine-tuned" by grinding or cutting to the precise length necessary after the horn has been tested. Disposed at a nodal region between the input and output of the horn is an integral mounting flange 19. Mounting flange 19 is of suitable rigid material, and must have an outside diameter larger than any diameter of any portion of the horn between the flange and the horn output end.

The flange may be of horn material if desired and must be rigidly secured to the horn. It may be integral with the horn or not.

The distance of the center plane of flange 19 from the input end of the horn will be an odd number of quarter wave lengths. The same is true of the distance between the center plane of flange 19 and the output end of the horn, it being understood that where a horn is longer than one-half wave length, then the wave distance of flange 19 center plane to such output end need not be the same as between the flange center plane and the input end. The only requirement is that flange 19 be located at a nodal region on the horn when the horn is transmitting longitudinally sonic energy from the input to the output.

The flange is so located that the nodal plane passes through the flange mid-plane (in theory, although in practice the nodal plane may vary some with frequency change under load). The flange thickness is determined to a substantial degree by mechanical considerations. The thickness and radial width of flange 19 will depend on such factors as the weight of the horn and whether the transducer is carried by the horn or has its own separate mounting and will also depend upon the stresses to which the horn may be subjected during usage. In general however, a radial width of flange 19 may be in the order of ⅛ of an inch or somewhat larger while the thickness may be about 1/32 inch. However, since the flange is located at the nodal point or region of the horn, the flange may extend for any desired radial distance. As shown here, the horn between input end 12 and flange 19 is cylindrical and has a diameter less than that of flange 19. The horn material is cut to provide a rounded fillet for making step 19a at one side of flange 19. Step 19b is provided on the other side of flange 19 by a fillet. The two steps happen to be of different diameters in this instance. A factor which may have a bearing upon the radial dimension of flange 19 and diameter of step 19b is the nature of the parts making up the detachable coupling and dimensions between the horn and fitting to be described.

Cooperating with the horn and particularly with mounting flange 19 and step 19b of the horn is fitting 23. Fitting 23 may be a fitting which is available on the market and which has at least three pipe stubs 25, 26 and 27 extending from body 24 of the fitting. Body 24 of the fitting provides chamber 29 within the fitting. The pipe stubs are hollow and communicate with chamber 24 within the fitting body so that fluid flow paths between all pipe stubs are provided. The fitting here illustrated in FIG. 1 is a T. While the pipe stubs are so arranged that adjacent pipe stubs have their respective axes perpendicular it is understood that variations for special purposes may be provided wherein the angle between axes of adjacent pipe stubs may be larger or smaller than 90°. It is also understood that instead of a T, a cross having four pipe stubs may be used. Such other fittings as Y's or modified T's and crosses are also available for certain types of work. In all cases, the fitting has its body whose interior defines a chamber with pipe stubs communicating with the chamber.

In accordance with the invention, a desired fitting will have the pipe stubs extending from the body thereof so shaped and provided with accessories such as gaskets as to provide the elements of a detachable coupling. For convenience a detachable coupling structure used in the dairy industry has been illustrated, it being understood that the details are merely exemplary. Except where the coupling is between a pipe stub of a fitting and the horn of a sonic energy means, the detachable couplings are conventional and may be used to couple other fluid transmitting or directing items such as elbows, nipples, reducers, enlargers, or desired lengths of pipe.

Referring now to stub portion 25 of the fitting, the free end is provided with integral outer flange 31 having face 32. Face 32 has formed therein semicircular annular groove 34. Cooperating with flange 31 is annular cruciform shaped gasket 36. Cooperating with gasket 36, which may be of rubber or other suitable sonic energy absorbing material, is mounting ring 38.

Mounting ring 38, in this instance for use in the dairy industry, is of stainless steel while the gaskets may be of buna S synthetic rubber. Such material for gaskets can withstand sterilizing temperatures. Other gasket material depending upon the end use, may be used. Ring 38 has a number of steps, the shape, number and dimensions of such steps should conform to good engineering practice. Thus the steps on opposite sides of a gasket should be dimensioned to avoid the possibility of shearing the gasket material when the metal parts are forced together to compress the gasket. In addition clearance space should be provided into which the gasket can flow. The gasket material, particularly the O-ring, should not be compressed so tightly that its sonic insulation function is impaired. In my previously identified application, this aspect is more fully considered. In all cases, mounting ring 38 should clear the metal of the horn so that the mounting ring is retained between the O-ring and cruciform gasket 36 for complete and effective sonic isolation of the horn.

If the transducer has its stationary mount, then it may be used alone or the mount for the horn may be used alone, or both may be used.

The normal detachable connection such as might be used between pipe stub 26 and pipe 26A would require a companion flange corresponding to flange 31. In this instance however and in order to provide insulation against leakage of ultra-sonic energy as well as fluid, mounting ring 38 of stainless steel is provided. It is essential to acoustically insulate the horn mounting flange from other metallic parts. In the structure so far described, mounting ring 38 plus gaskets 36 and O-ring 42 cooperate to provide such sonic isolation with respect to the horn mounting flange 19. The detachable coupling assembly so far described is maintained firmly assembled by clamp 45 having the shape shown to enclose both the exposed side of flange 31 and exposed face of mounting ring 38. The clamp has open ends joined by a screw arrangement with a coarse thread so that by turning wing nut 47, the clamp may be loosened or tightened. The clamp has a flattened spring part 48 for permitting the clamp ring to open or close. Thus a readily detachable fluid proof and sonic proof coupling is provided between the horn and a pipe stub. Instead of having cruciform shaped gasket 36 and O-ring 42 as separate pieces, it is possible to integrate these two gaskets into one as shown in FIG. 1B. The mounting ring steps are rearranged to avoid shearing the gasket tongue when the mounting ring is tightened against the gasket. However the two gasket construction is simple with the O-ring being available on the market and the cruciform shaped gasket 36 also being available from the manufacturer of such fittings. Various other forms of clamps for retaining the parts of a detachable coupling in appropiate relation to each other are available.

As a rule, the chamber within the fitting between the inner ends of the pipe stubs may be used to define a reaction chamber for sonic irradiation. Accordingly the portion of the horn between the horn mounting flange and the output end of the horn should have such a length relative to the length of the pipe stub (it is understood of course that the acoustic length of the horn between the mounting flange and the output end must also be considered so that the output end is an odd number of quarter wave lengths from the horn mounting flange) so that the sonic emitting end of the horn will be at a desired part of chamber 24. Thus the reaction chamber will be defined by the inner wall of the fitting on the one hand and the outer surface of the horn on the other hand. As shown in FIG. 1, the horn output end is located well within chamber 24 near the inlet ends of pipe stubs 26 and 27. Thus fluid going from pipe stub 27 toward output face 17 of the horn and then into pipe stub 26 can be irradiated with sonic energy. The direction of fluid flow may be reversed. The exact dimensions of the chamber and location of sonic output end 17 of the horn will depend upon such factors as the speed of flow of fluid, the nature, pressure, temperature of the fluid and other factors.

The horn shape illustrated in FIG. 1 of the drawing will normally impress forces upon the fluid, whether liquid or gas, that will result in compression or tension upon particles or droplets.

FIG. 5 shows a horn generally similar to the horn of FIGS. 1 and 3 except that the output part between mounting flange and output end is tapered. The taper may be linear or follow any desired geometrical or other curve. In some instances a horn arrangement for creating shear in the material flowing through chamber 24 becomes desirable. To this extent a mushroom shaped horn illustrated in FIG. 6 may be used. The dotted lines indicate a possible arrangement of horn in a fitting. By having the mushroom head or projecting portion of the horn end located near the inner end of pipe 27, thus creating a narrow annular region through which fluid particles pass, it is possible to impress shear forces on the fluid being subjected to sonic radiation.

By controlling the shape of the horn and the dimensions thereof and selecting an appropriately dimensioned fitting, a variety of forces upon the liquid stream can be created. Such forces may occur in succession as the fluid stream progresses. For the first time in this art, a flowing fluid stream may be subjected to shear (as the stream passes the narrow gap at the edge of the mushroom head of FIG. 6) and subjected to compression and tension approaching the flat end faces of the mushroom head. The relative intensities of these forces (compression and shear) will be a function of the horn shape, dimensions, the inside shape and dimensions of the fitting, speed of fluid flow, absence or presence of cavitation, the intensity of sonic energy, etc. As a rule in prior art devices, it was only possible to impress substantial shear or substantial compression alone as the case may be. Here however the same fitting may be used with a horn to provide in substantial degrees different kinds of forces acting sequentially upon the stream.

Referring now to FIG. 2, a general cross shaped fitting is used with horns detachably secured to opposing fitting pipe stubs. It is possible to have the horns mounted in adjacent pipe stubs and control the intensity of the field between the opposed or separated horn output faces. By controlling the distance between the output faces of horns, it is possible to impress ultra-sonic energy on the material either in phase or in opposed phase. All this is possible without in any way limiting the flexibility of the apparatus or interfering with its ready detachability or demountability. In dotted lines, horns as shown in FIGS. 1, 3 and 6 are suggested. Any kinds of horn combinations are possible. It is not even necessary to have the same frequency for the two horns. One horn may be replaced by a sonic reflector or the one horn may not be energized by a transducer so that it functions as a reflector.

What is claimed is:

1. A device for providing a reaction chamber within which ultra-sonic irradiation of a stream of material can occur, said device comprising a horn whose length is an integral number of half waves, said horn having a sonic input end and a sonic output end with an outwardly extending rigid mounting flange at a nodal portion thereof, said flange having an outer diameter greater than any horn diameter, a fitting having at least three pipe stubs extending from a fitting body with the stub interiors communicating with a chamber within the body for providing flow paths between stubs, each pipe stub having its free end shaped to provide one element of a readily detachable pipe coupling, at least one pipe stub having an internal diameter large enough to accommodate the insertion therein of the horn portion between the mounting flange and sonic output end, said one pipe stub end including an external flange for use with the horn mounting flange to function as parts of the elements of a detachable coupling for mounting the horn in said one stub end, said coupling including sonic energy insulating means at the horn flange for minimizing escape of sonic energy from the horn nodal flange, the said one pipe stub and chamber within the fitting body being dimensioned relative to the horn so that when said horn is installed in said fitting, a reaction chamber is provided between the horn exterior and fitting interior surfaces to subject materials in said stream to compression, tension or shear forces, depending upon the flow path, shapes and dimensions of such paths whereby dismantling of the horn and fitting may be readily accomplished.

2. The construction according to claim 1 wherein said one pipe stub is shorter than one-fourth of the wave length of the ultra-sonic energy whereby the horn output end is beyond the inner end of said one pipe stub and extends into the chamber within the fitting body.

3. The construction according to claim 1 wherein said horn mounting flange has one side thereof facing the stub flange with a sealing gasket portion therebetween and wherein said horn mounting flange has its other side provided with a sonic energy insulating gasket portion and a mounting ring at the free side of said last-named gasket portion and wherein a readily removable clamping ring encloses the horn mounting flange and said one pipe stub mounting flange and the ring together with gasket portions for compressing the horn and said one pipe stub end to provide a readily detachable fluid tight and sonic proof coupling.

4. The construction according to claim 3 wherein the horn length is one-half wave length with said mounting flange at the nodal region.

5. The construction according to claim 4 wherein the portion of the horn between the mounting flange and horn output end has a shape such that every cross section is substantially circular and wherein said external horn shape is a surface of revolution generated by a straight line.

6. The construction according to claim 4, wherein said horn has a generally mushroom shaped tip portion located so that a flow path is provided where material is subjected to shear forces when irradiated with ultra-sonic energy.

7. A system for irradiating material comprising an ultra-sonic horn having a length equal to an integral number of half wave lengths, said horn having sonic input and sonic output ends with an outwardly extending mounting flange at a nodal region of said horn, means for supplying sonic energy to said horn input end, a fitting having at least three pipe stubs extending from the body of said fitting with the stub interior communicating with a chamber within the body, each pipe stub having its free end shaped to provide an element of a readily detachable pipe coupling, at least one pipe stub having an internal diameter to accommodate the insertion therein of the horn portion between the mounting flange and sonic output end, said one pipe stub end including an external flange for cooperation with the horn mounting flange to provide elements of a detachable coupling for mounting the horn at one stub end, said detachable coupling including gasket means for sonic energy insulation means on opposite sides of the horn flange, the said one pipe stub and chamber within the fitting body being dimensioned so that when said horn is coupled to said fitting, a reaction chamber is provided between the horn exterior and fitting interior surfaces to subject material to compression, tension or shear forces depending upon the field flow paths, shapes and dimensions, said system being readily detachable.

8. The system according to claim 7 wherein said fitting is a T.

9. The system according to claim 7 wherein said fitting is a cross.

10. The system according to claim 9 wherein two horns are mounted on two pipe stubs.

11. The system according to claim 9 wherein one of said stubs has mounted therein a sonic reflecting means.

References Cited
UNITED STATES PATENTS

| | | | |
|---|---|---|---|
| 2,463,569 | 3/1949 | Smith | 204—193 |
| 2,777,813 | 1/1957 | Totzak | 23—252 B |

HOWARD S. WILLIAMS, Primary Examiner

U.S. Cl. X.R.
23—252 B; 99—451